Patented Sept. 17, 1929

1,728,656

UNITED STATES PATENT OFFICE

JOHN M. BRANDLEY, OF ST. LOUIS, MISSOURI

ODOR ABSORBENT

No Drawing.   Application filed July 13, 1928.   Serial No. 292,600.

My invention relates to improvements in odor absorbents and more particularly to an article of the kind described which may be placed in an ice-box, closet, pantry, etc., and which has the properties of absorbing the undesirable odors arising therein and whereby said places shall remain clean and sweet-smelling.

My invention has among its objects, the production of an article of the kind described, which shall be simple, convenient, economical, reliable, and efficient and satisfactory for use wherever found applicable.

Many other objects and advantages of the invention herein shown and described will be obvious to those skilled in the art to which this invention appertains, from the disclosures herein given.

To this end, my invention consists in the novel composition and method of manufacture herein described, and more particularly pointed out in the claims.

It is very well known that when certain articles are placed in refrigerators, etc., the odors arising therefrom will be carried to other parts of the container and thus cause the entire contents of the same to become contaminated. This is highly undesirable.

As will be hereinafter described, I have produced a compound, which is formed to any desired suitable shape and then placed in the container in which the undesirable odors are apt to form, and whereby these odors will become absorbed by this product, to thereby disinfect and purify the container.

The compound comprising the invention consists of a carbonaceous material intermixed with a binder, and thence treated and worked to the desired shape.

The carbonaceous material that I have found most desirable for the purpose is hardwood carbon or charcoal, said material being powdered or pulverized. The hardwood charcoal is very highly "activated," much more so than other types of similar material, so that it is odor-absorbent to a high degree.

The pulverized hardwood charcoal is intermixed with a quantity of powdered gum, preferably a water-soluble gum such as gum acacia, and a quantity of sugar. The sugar and gum act as a binder to hold the particles of the charcoal together, and the sugar itself acts to assist the gum to more easily dissolve in the presence of water, and so that said gum will not lump.

The sugar, charcoal and water-soluble gum are intermixed in any suitable manner, as in a rotating drum or the like, and while so rotating, water in the form of a spray is played thereonto to moisten the same, but insufficient to form a paste.

The moistened mixture is then conducted through a granulating machine, and is discharged therefrom as granules. The compound is then dried in any suitable manner and conducted into a compressor machine, in which it is compressed to the desired shape, as for example a cube, disk, or the like.

If desired, the edges of the compressed article may be reinforced by a strip of light metal placed thereon at the time of compressing or thereafter.

The finished product will be very highly absorbent, will not easily crumble, will occupy but little space in the refrigerator or the like, will be very economical, and be otherwise admirably suited to the purpose for which it is intended.

The gums used, as for example the gum acacia mentioned or gum tragacanth, etc., are odorless and will not close the pores or interstices between the particles of the charcoal.

The quantities of the ingredients used in the compound may vary somewhat, but 1 have found that very good results are obtained by compounding them in the proportions of approximately 3½ pounds of powdered gum acacia, 90 pounds of hardwood carbon, 4 gallons of water, and 10 pounds of sugar.

Having thus described my invention it is obvious that various immaterial modifications may be made in the same without departing from the spirit of my invention; hence I do not wish to be understood as limiting myself to the exact proportions and ingredients used, and the method of making the same, except as limited by the claims.

What I claim as new and desire to secure by Letters Patent is:

1. An article of the kind described, comprising a quantity of particles of comminuted hardwood carbon and a gum intermixed therewith and forming a binder therefor.

2. An article of the kind described, comprising hardwood carbon, water-soluble gum, and sugar all intermixed and formed to the desired shape.

3. An odor absorbent article, comprising as ingredients, particles of hardwood carbon, powdered gum, water, and sugar, intermixed and granulated, and thence compressed to shape.

4. A compound for making an odor absorbent article, comprising powdered hardwood carbon, powdered gum acacia, water and sugar, in approximately the proportions of 90 pounds of carbon, 3½ pounds gum acacia, 4 gallons of water, and 10 pounds of sugar.

JOHN M. BRANDLEY.